United States Patent
Rodyushkin et al.

(10) Patent No.: US 11,657,283 B2
(45) Date of Patent: May 23, 2023

(54) AUTOMATED SELECTION OF PRIORS FOR TRAINING OF DETECTION CONVOLUTIONAL NEURAL NETWORKS

(71) Applicant: INTEL CORPORATION, Santa Clara, CA (US)

(72) Inventors: Konstantin Rodyushkin, Nishny Novgorod (RU); Alexander Bovyrin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 284 days.

(21) Appl. No.: 16/772,358

(22) PCT Filed: Feb. 5, 2018

(86) PCT No.: PCT/IB2018/000280
§ 371 (c)(1),
(2) Date: Jun. 12, 2020

(87) PCT Pub. No.: WO2019/150158
PCT Pub. Date: Aug. 8, 2019

(65) Prior Publication Data
US 2021/0081797 A1  Mar. 18, 2021

(51) Int. Cl.
*G06N 3/08* (2023.01)
*G06K 9/62* (2022.01)
(Continued)

(52) U.S. Cl.
CPC ........... *G06N 3/082* (2013.01); *G06K 9/6256* (2013.01); *G06K 9/6262* (2013.01); *G06V 10/7553* (2022.01)

(58) Field of Classification Search
CPC ...... G06K 9/00496; G06K 9/62; G06N 3/082; G06N 3/0454; G06V 10/7553; G06V 10/82
See application file for complete search history.

(56) References Cited

U.S. PATENT DOCUMENTS 10,579,897 B2 * 3/2020 Redmon ............... G06V 10/56
2019/0130580 A1 * 5/2019 Chen ..................... G06T 7/246

FOREIGN PATENT DOCUMENTS

CN       111512321       8/2020
WO      2018000309       1/2018
(Continued)

OTHER PUBLICATIONS

Liu, Wei, et al. "Ssd: Single shot multibox detector." European conference on computer vision. Springer, Cham, 2016. (Year: 2016).*

(Continued)

*Primary Examiner* — Ross Varndell
(74) *Attorney, Agent, or Firm* — Hanley, Flight & Zimmerman, LLC

(57) ABSTRACT

An example apparatus for selecting priors includes a training set receiver to receive a training dataset. The apparatus includes a prior generator to generate a set of redundant priors based on the training dataset. The apparatus includes an intermediate trainer to train a detection CNN using the set of redundant priors. The apparatus includes a score and location receiver to send all training samples of the training dataset to the trained detection CNN and receive responses for all of the redundant priors in the set of redundant priors. The apparatus includes a subset selector to select a subset of the set of redundant priors based on the responses.

23 Claims, 6 Drawing Sheets

(51) Int. Cl.
*G06V 10/75* (2022.01)
*G06N 3/082* (2023.01)

(56) References Cited

FOREIGN PATENT DOCUMENTS

| WO | 2018000309 A1 | 1/2018 |
|---|---|---|
| WO | 2019150158 | 8/2019 |

OTHER PUBLICATIONS

International Searching Authority, "Search Report," issued in connection with International Patent Application No. PCT/IB2018/00280, dated Jun. 25, 2019, 5 pages.
Xie et al., "Visualization and Pruning of SSd with the base network VGG16," Deep Learning Technologies, ACM, Jun. 2, 2017, 5 pages.
Szegedy et al., "Scalable, High-Qaulity Object Detection," [https://arxiv.org] Feb. 26, 2015, 29, pages.
Liu et al., "SSD: Single Shot Multibox Detector," [https://aixiv.org/pdf/1512.02325.pdf], Dec. 29, 2016, 17 pages.
Huang et al., "Speed/accuracy trade-offs for modern convolutional object detectors," {https://arxiv.or], Apr. 25, 2017, 21 pages.
International Searching Authority, "Written Opinion" issued in connection with International Patent Application No. PCT/IB2018/00280, dated Jun. 25, 2019, 11 pages.
International Searching Authority, "International Preliminary Report on Patentability" issued in connection with International Patent Application No. PCT/IB2018/00280, dated Jun. 25, 2019, 9 pages.
International Search Report for Related PCT Application PCT/IB2018/000280, dated May 7, 2019, 2 pages.
Xie et al. "Visualization and Pruning of SSD With the Base Network VGG16";: Deep Learning Technologies, ACM, 2 Penn Plaza, Suite 710, New York, NY, USA, Jun. 2017, pp. 90-94.
Liu et al. "SSD Single Shot Mutibox Detector";: Computer Science > Computer Vision and Pattern Recognition,Submitted on Dec. 8, 2015 (v1), last revised Dec. 29, 2016 (this version, v5), European Conference on Computer Vision, 17 pages.
Szegedy et al. "Scalable, High-Quality Object Detection";: Computer Science > Computer Vision and Pattern Recognition,Submitted on Dec. 3, 2014 (v1), last revised Dec. 9, 2015 (this version, v3), 29 pages.
Huang et al. "Speed/Accuracy Trade-Offs for Modern Object Detectors";: Computer Science > Computer Vision and Pattern Recognition, Submitted on Nov. 30, 2016 (v1), last revised Apr. 25, 2017 (this version, v3), 10 pages.

* cited by examiner

400

AUTOMATED SELECTION OF PRIORS FOR TRAINING OF DETECTION CONVOLUTIONAL NEURAL NETWORKS

CROSS REFERENCE TO RELATED APPLICATIONS

Pursuant to 35 U.S.C. § 371, this application is the United States National Stage Application of International Patent Application No. PCT/M2018/000280, filed on Feb. 5, 2018, the contents of which are incorporated by reference as if set forth in their entirety herein.

BACKGROUND

Modern object detector architectures such as Single Shot MultiBox Detector (SSD) and SSD-like object detectors may be based on a multibox detector convolutional neural network (CNN) structure. As used herein, SSD-like object detectors include a CNN backbone that produces a set of feature maps with different scales and a set of object type classifiers together with object size and position regressors. For example, a multibox detector CNN structure may include a number of layers including a number of convolutional layers forming a base network and a number of convolutional feature maps.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
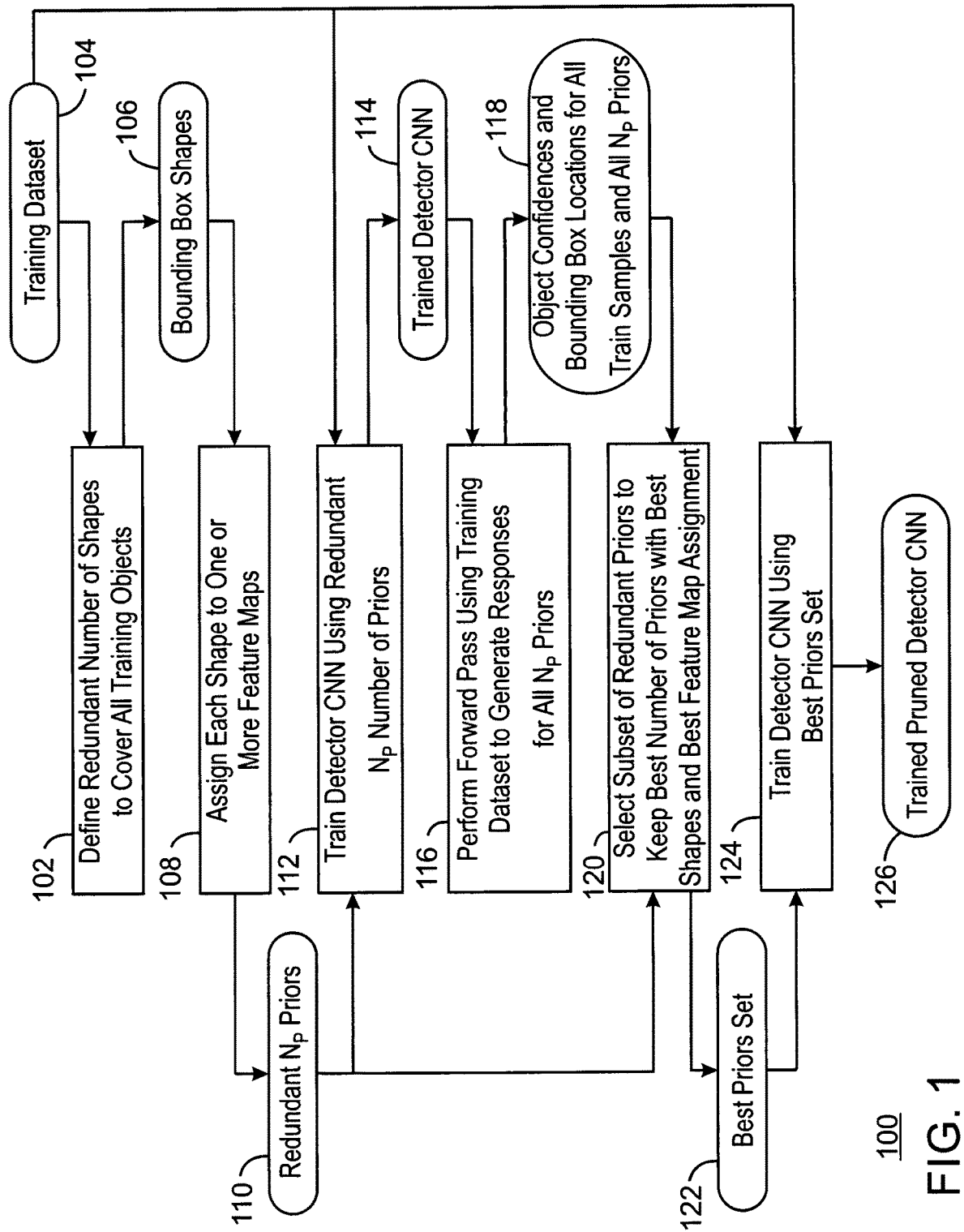
FIG. 1 is a flow chart illustrating an example process for automatic selection of optimal priors and training a detector using a selected set of priors.

As discussed above, SSD-like object detectors may operate in two stages. For example, the object detector may first have an input image passed through a convolutional neural network (CNN) backbone and each prior may run its own classifier and location regressor on each one of the feature maps. As used herein, a prior refers to an anchor bounding box with a specific box size that is assigned to a specific feature map. The specific box size may include a width and a height of the anchor bounding box. For example, each prior box may include an object class predictor, an object location, and one or more size regressors. As a result of the forward pass through the CNN, for each prior, bounding box locations and class scores may be calculated for each feature map cell. For example, such architectures may use the CNN as a backbone to calculate deep features and a set of object location predictors that predict class scores and object locations using the deep features as an input. In some examples, each object location predictor may be associated with a prior that may be defined by parameters including an object bounding box shape and an associated feature map. The detector may then filter out a list of all predicted bounding boxes using a non-maximum suppression (NMS) procedure to obtain a final detection result.

The configuration of priors for such detectors, including the number of priors, bounding box shapes of the priors, and associated feature maps, may typically be defined manually or using bounding box shapes clustering. However, manual selection of priors may involve expert deep knowledge and some intuition about CNNs and their feature maps' representation power. In addition, other methods of selecting priors such as bounding box shape clustering may not take detection quality metrics into account. Moreover, such methods may not be able to determine a best result nor be able to assign feature maps or determine which deep features layer is to be used with a given shape of a prior. Moreover, the accuracy and speed of object detectors trained using deep learning may highly depend on the priors selected for training the object detectors, in addition to the parameters of the selected priors.

The present disclosure relates generally to techniques for selecting priors for object class, position and shape prediction. Specifically, the techniques described herein include an apparatus, method and system for automatically selecting priors. An example apparatus includes a training set receiver to receive a training dataset. The apparatus includes a prior generator to generate a set of redundant priors based on the training dataset. The apparatus further includes an intermediate trainer to train a detection convolutional neural network (CNN) using the set of redundant priors. The apparatus also includes a score and location receiver to send all training samples of the training dataset to the trained detection CNN and receive responses for all of the redundant priors in the set of redundant priors. The apparatus further includes a subset selector to select a subset of priors from the set of redundant priors based on the responses.

The techniques described herein thus enable improved sets of priors to be selected automatically for use in training object detectors. For example, the techniques described herein enable automated estimation and selection of the number of priors used, the shape of the priors, and associated feature maps for the priors. In some examples, the techniques described herein can be used to choose optimal shapes of priors automatically and to assign a suitable feature map for each prior automatically based on detection quality metrics calculated using training data. Thus, an automatically driven prior selection and configuration using the techniques herein may provide higher detection quality on the same CNN architecture. Specifically, the techniques described herein enable selection of a prior configuration that gives better detection accuracy and reduces of the number of priors used without accuracy degradation, thus significantly decreasing computational load. For example, the techniques described herein may reduce computational load by 15% to 30% depending on the particular SSD architecture used.

In addition, the techniques described herein can be used to increase the speed of object detection. For example, the techniques can be used to find an optimal prior configuration that takes into account prior classifiers computational cost. The priors cost can be reduced by 40% using the techniques herein with improved accuracy. This cost reduction may be significant for modern light weight CNN backbones that have comparable computational cost with prior classifiers. Moreover, such a cost reduction can be used to run additional detectors simultaneously in the same chip. In addition, the cost reduction may enable real-time detection on weaker computer chips with less power consumption.

The techniques described herein also enable avoidance of CNN retraining and inference for each prior pruning iteration. Thus, non-maximum suppression (NMS) may only be run on the responses from a testing priors subset, resulting in additional efficiency in detection.

FIG. 1 is a flow chart illustrating an example process for automatic selection of optimal priors and training a detector using a selected set of priors. The example process is generally referred to by the reference number 100 and can be implemented in the computing device 500 below. For example, the process can be implemented using the processor 502 of the computing device 500.

At block 102, the processor defines a redundant number of shapes to cover all training objects. For example, redundant means that the processor may initially define many shapes in a set of potential priors, but not all of shapes of the potential priors may be selected and used as priors in a final model. Thus, redundant shapes as used herein refers to an initial set of shapes that is to be further pruned. In some examples, the number of prior shapes can be based on a received training dataset 104 containing the training objects. For example, i=1 . . . $N_i$ may refer to an index of training images with $N_i$ number of training images. In some examples, the redundant number of shapes may densely cover all possible object bounding box shapes of the training dataset 104. As one example, 100 priors with different shapes may be defined. In some examples, the process can output a predetermined number of bounding box shapes 106.

At block 108, the processor assigns each of the bounding box shapes 106 to one or more feature maps. For example, the processor can assign each prior shape to a suitable feature map. X(p) may refer to a set of cells of feature map that is assigned to a prior p. For each feature map cell x∈X(p), the prior p may have its own class score and location prediction. In some examples, if several suitable feature maps are identified for a particular prior, then the processor can replicate the prior for each of the several suitable feature maps. As a result, in some examples, two or more priors for different feature maps may have the same shape. In some examples, the processor can later perform an optimization procedure to automatically keep one prior that is assigned to a more effective feature map that can be used to detect objects more accurately. In some examples, the processor may output a total number $N_P$ of redundant priors 110.

At block 112, the processor trains a detector CNN using the redundant number of priors $N_P$ 110. For example, during a training process, the processor can estimate a loss function for all prior results and calculate a loss derivative during a backward pass for further weight tuning according to a training schedule. For example, the prior results may include a classification result and a pose regression result for each of the priors. In some examples, the processor can perform weight tuning using any suitable algorithm, such as stochastic gradient descent (SGD), the ADAM algorithm, etc. In some examples, the training of the detector CNN may result in a trained detector CNN 114.

At block 116, the processor performs a forward pass on the trained detector CNN 144 using the training dataset 104 to obtain responses for all of the priors $N_P$ 110. For example, the processor can generate object confidences and bounding box location predictions for all of the priors $N_P$ 110.

$R(P)=\{c_{i,p,x}, cx_{i,p,x}, cy_{i,p,x}, w_{i,p,x}, h_{i,p,x}\}$, i=1 . . . $N_i$, x∈X(p), p∈P may refer to the set of responses that are produced by the detector CNN 144 for prior set P after the forward pass. The set of all available responses can be represented as R({1 . . . $N_p$}), where $c_{i,p,x}$ refers to the class score estimation, $cx_{i,p,x}$, $cy_{i,p,x}$ refers to the object center estimation, and $w_{i,p,x}, h_{i,p,x}$ refers to the object size estimation for given image i, given prior p and given position x. In some examples, the object confidences may be in the form of class scores. In some examples, all of the training samples in the training dataset 104 and associated object confidences and location and size predictions can be stored for later use as input data for optimization at block 120, as illustrated and described in greater detail in FIG. 2 below.

At block 120, the processor selects a subset of the redundant priors to keep the best number of priors with the best shapes and best feature maps assignments and generates a best priors set 122. For example, the best priors set 122 may include a particular configuration of a number of priors, prior shapes and associated features maps that results in a higher detection quality metric. In some examples, the processor can prune, or remove, one or more priors from the redundant priors $N_P$ 110 to generate the best priors set 122. In some examples, the processor can prune priors based on one or more detection quality metrics. For example, the one or more detection quality metrics can include average precision (AP), mean average precision (mAP), log-average miss rate, among any other suitable detection quality metrics. In some examples, the processor can also grow the best priors set by adding one or more priors to the best priors set 122 based on the one or more detection quality metrics. The processor can also configure the resulting best priors set based not only on object shape distribution but may also take into account the classification ability of different CNN feature maps for different object shapes. For example, the processor can select a shape of the priors and associated feature maps for the priors based on the one or more detection quality metrics. For example, the processor can execute a first pruning function:

function $P_{t-1} \leftarrow \text{prune1}(P_t)$ $p^* \leftarrow \arg\max_{p \in P_t} DQM(NMS(R(P_t \setminus \{p\})))$ $P_{t-1} \leftarrow P_t \setminus \{p^*\}$ where p is a prior from redundant priors set $P_{t^*}$, $R(P_t \setminus \{p\})$ is a set of associated responses for the subset of redundant priors excluding prior p, p* is the most useless prior identified using any suitable detection quality metric DQM and $P_{t-1}$ is the resulting pruned prior subset. As used herein, P represents a current prior configuration that is set of prior indexes. For example P={1 . . . $N_p$} is configuration that includes all $N_p$ priors. As used herein, $DQM(R^{NMS}(P))$ refers to a detection quality metric that can be any kind of metric calculated on a final detection result. For example, it can be widely used average precision or mean average precision or any other metric suitable for solving a detection task. In some examples, the processor can generate an optimal configuration by starting with a full priors set $P_{N_p} = \{1 \ldots N_p\}$ and iteratively reducing the number of priors by running the first pruning function until there is no longer any prior left to prune. Then, the processor may chose the configuration with a number of priors that gives a maximal DQM to be the optimal configuration. For example, the processor can use a pure DQM, such as AP, MAP, or others, as a cost function to obtain maximal detection quality without taking into account other criteria. For example, the first pruning function may take the form:

```
t ← N_p
P_t ← {1 ... N_p}
P* ← P_t
while t > 1
    P_{t-1} ← prune1(P_t)

P* = arg max_{P∈{P*,P_{t-1}}} DQM(P)

t ← t - 1
end
``` where P* is the found prior configuration. This example of the first pruning function is described in greater detail with respect to FIG. 3 below.

In some examples, the processor may also execute a second pruning function to increase the DQM per floating point operations per second (flops):

function $P_{t-1} \leftarrow prune2(P_t)$ $$p^* \leftarrow \arg\max_{p \in P_t} \frac{DQM(NMS(R(P_t \setminus \{p\}))) - DQM(NMS(R(P_t)))}{FLOP(p)}$$

$P_{t-1} \leftarrow P_t \setminus \{p^*\}$ where FLOP(p) is the FLOPs that are required to calculate a response, such as a class score and bounding box location, for a $p^{th}$ prior. In some examples, the processor may repeat the pruning procedure until a given FLOP* is reached. For example, the second pruning function may take the form:

```
t ← N_p
P_t ← {1 ... N_p}
while FLOP(P_t) > FLOP*
    P_{t-1} ← prune2(P_t)
    t ← t - 1
end
```

In the case of finding optimal configuration using minimal priors floating point operations (FLOP), the processor may use other criteria in addition to DQM. For example, instead of using a pure DQM, the processor can use a ratio of DQM increasing to FLOP for pruning priors.

In some examples, the processor can also use one or more growth phases to generate an improved prior set. For example, the processor may start an example growth phase with a prior configuration $P_t$ that has t priors and produce a configuration $P_{t+1}$ with t+1 priors by adding the most useful prior that is not yet used in $P_t$. Then, similar to the pruning phase discussed above, the processor can use one or more criteria. For example, a first criterion may be based on pure DQM and applied in case when only maximal DQM is to be used without any regret about computational cost. In some examples, a second criterion may be based on a DQM/FLOP ratio and used in examples when an optimal DQM is to be calculated with a minimal prior FLOP. For example, the processor may execute the example growth functions:

function $P_{t+1} \leftarrow grow1(P_t)$ $p^* \leftarrow \arg\max_{p \in \{1...N_p\} \setminus P_t} DQM(NMS(R(P_t \cup \{p\})))$ $P_{t+1} \leftarrow P_t \cup \{p^*\}$ function $P_{t+1} \leftarrow grow2(P_t)$ $$p^* \leftarrow \arg\max_{p \in \{1...N_p\} \setminus P_t} \frac{DQM(NMS(R(P_t \cup \{p\}))) - DQM(NMS(R(P_t)))}{FLOP(p)}$$

$P_{t+1} \leftarrow P_t \cup \{p^*\}$

In some examples, the processor can combine pruning and growth phases to generate an improved prior set. For example, instead of executing only a pruning function on each iteration, the processor may alternate with an additional grow step to try find a more optimal configuration to start a new prune from a more optimal point. In some examples, such iterative execution can be repeated several times until a predefined number of iterations $N_s$ is reached. For example, the processor may use the following functions to iteratively prune and grow priors to generate the prior set:

```
prune-grow1a:
t ← N_p
P_t ← {1 ... N_p}
P* ← P_t
while t > 1
    P_{t-1} ← prune1(P_t)

P* = arg max_{P∈{P*,P_{t-1}}} DQM(P)

s ← N_s
    while s > 0
        P_t ← grow1(P_{t-1})

P* = arg max_{P∈{P*,P_t}} DQM(P)

P_{t-1} ← prune1(P_t)

P* = arg max_{P∈{P*,P_{t-1}}} DQM(P)

s ← s - 1
    end
    t ← t - 1
end
prune-grow2a:
t ← N_p
P_t ← {1 ... N_p}
while FLOP(P_t) > FLOP*
    P_{t-1} ← prune2(P_t)
    s ← N_s
    while s > 0
        P_{t-1} ← prune2(grow2(P_{t-1}))
        s ← s - 1
    end
    t ← t - 1
end
``` where P* is a found prior configuration. In some examples, the processor may proceed by pruning two priors, growing one prior, and repeating the process until a predetermined number of iterations are performed. In some examples, the processor can perform iterative grow-pruning starting from an empty set. In each iteration, the processor can add a yet unused prior to current prior set based on its value added to optimization criterion. For example, the processor can perform iterative grow-pruning from an empty set using the following example functions:

```
grow-prune1b:
  t ← 0
  P_t ← {}
  P* ← P_t
  while t < N_p*
    P_{t+1} ← grow1(P_t)

P* = arg  max      DQM(P)
           P∈{P*,P_{t+1}} s ← N_s
    while s > 0
      P_t ← prune1(P_{t+1})

P* = arg  max    DQM(P)
             P∈{P*,P_t}

P_{t+1} ← grow1(P_t)

P* = arg  max      DQM(P)
             P∈{P*,P_{t+1}} s ← s - 1
    end
    t ← t + 1
  end
grow-prune2b:
  t ← 0
  P_t ← {}
  while FLOP(P_t) < FLOP*
    P_{t+1} ← grow2(P_t)
    s ← N_s
    while s > 0
      P_{t+1} ← grow2(prune2(P_{t+1}))
      s ← s - 1
    end
    t ← t + 1
  end
```

In some examples, the processor may proceed from an empty set by iteratively growing two priors, then pruning one prior, and repeating the process for a predetermined number of times.

At block 124, the processor trains a detector CNN defined using the best priors set 122. For example, a CNN having box number, shape defined by the best priors set 122 may be further trained in order to estimate additional parameters such as classifiers and repressor weights. In some examples, any suitable CNN training procedure may be used to estimate the classifiers and repressor weights. The resulting trained pruned detector CNN 126 can then be used to detect objects in future input images.

This process flow diagram is not intended to indicate that the blocks of the example process 100 are to be executed in any particular order, or that all of the blocks are to be included in every case. Further, any number of additional blocks not shown may be included within the example process 100, depending on the details of the specific implementation.

Figure 2:
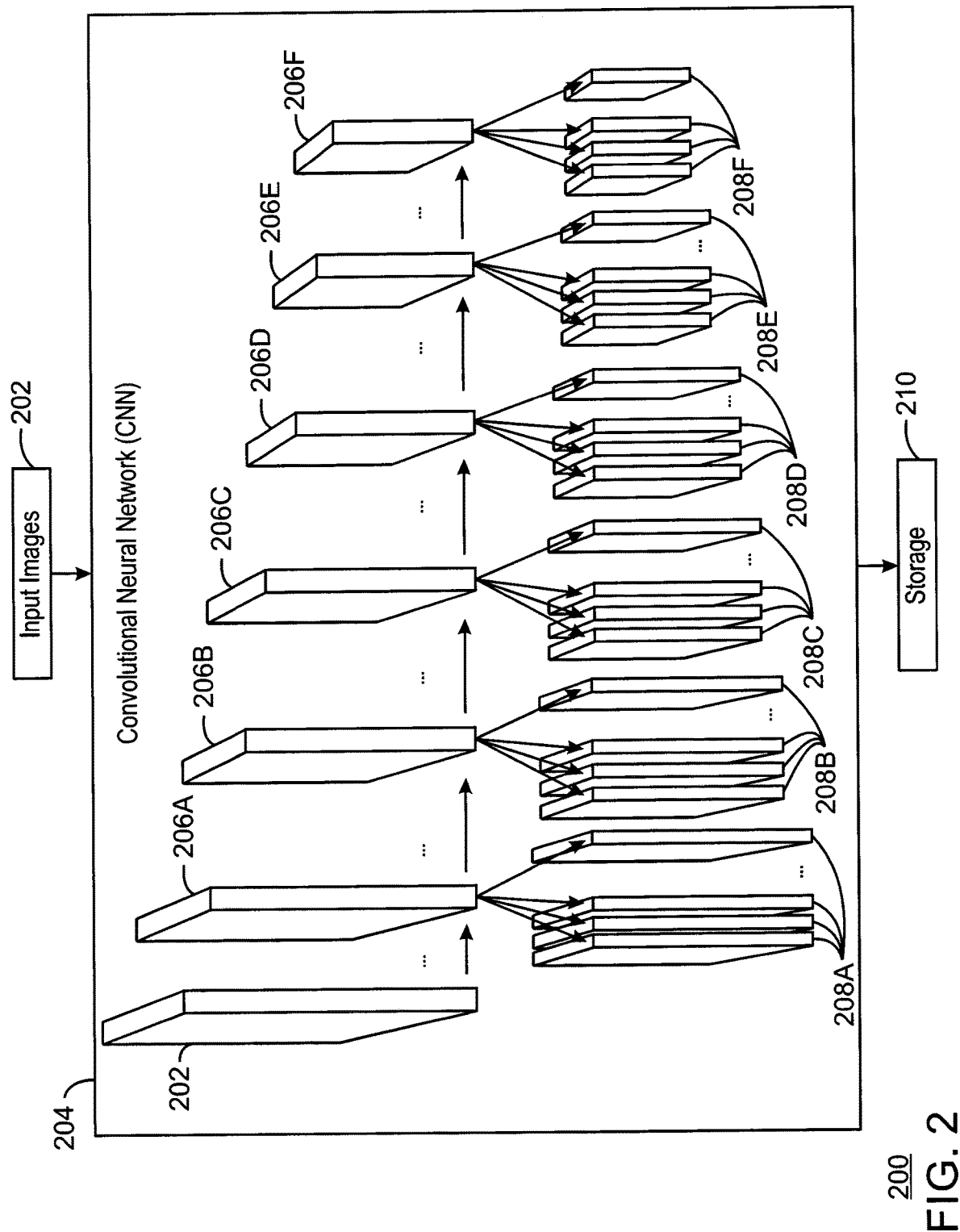
FIG. 2 is a block diagram illustrating an example system for automatically generating a set of priors responses to be used for prior selection.

FIG. 2 is a block diagram illustrating an example system for generating a set of priors to be pruned. The example system is referred to generally by the reference number 200 and can be implemented in the computing device 500 below in FIG. 5 using the method 400 of FIG. 4 below.

The example system 200 includes a convolutional neural network (CNN) 202. The CNN 202 includes an example input image input_image 204 and a number of feature maps, including feature map 1 (FM1) 206A, FM2 206B, FM3 206C, FM4 206D, FM5 206E, and FM6 206F. The system 200 also includes a number of CNN responses 208A, 208B, 208C, 208D, 208E, and 208F, associated with feature maps 206A, 206B, 206C, 206D, 206E, and 206F, respectively. For example, the responses 208A, 208B, 208C, 208D, 208E, and 208F may include class scores and bounding box locations. The system also further includes a storage 210 communicatively coupled to the CNN 202. For example, the storage 210 may store As shown in FIG. 2, a processor may initiate a forward pass on a trained backbone CNN 204 using an input image 202 that is processed using feature maps 206A-206F. The feature maps 206A-206F may generate corresponding responses 208A-208F during the forward pass. For example, each of the responses 208A-208F may include class scores and bounding box locations for each of the cells in each of the feature maps 206A-206F.

In some examples, the training samples and associated class scores and bounding boxes can be saved to storage 210 for subsequent use. For example, the stored responses may be used for iteratively pruning priors as described in FIG. 3 below.

The diagram of FIG. 2 is not intended to indicate that the example system 200 is to include all of the components shown in FIG. 2. Rather, the example system 200 can be implemented using fewer or additional components not illustrated in FIG. 2 (e.g., additional input images, convolutional layers, feature maps, responses, etc.).

Figure 3:
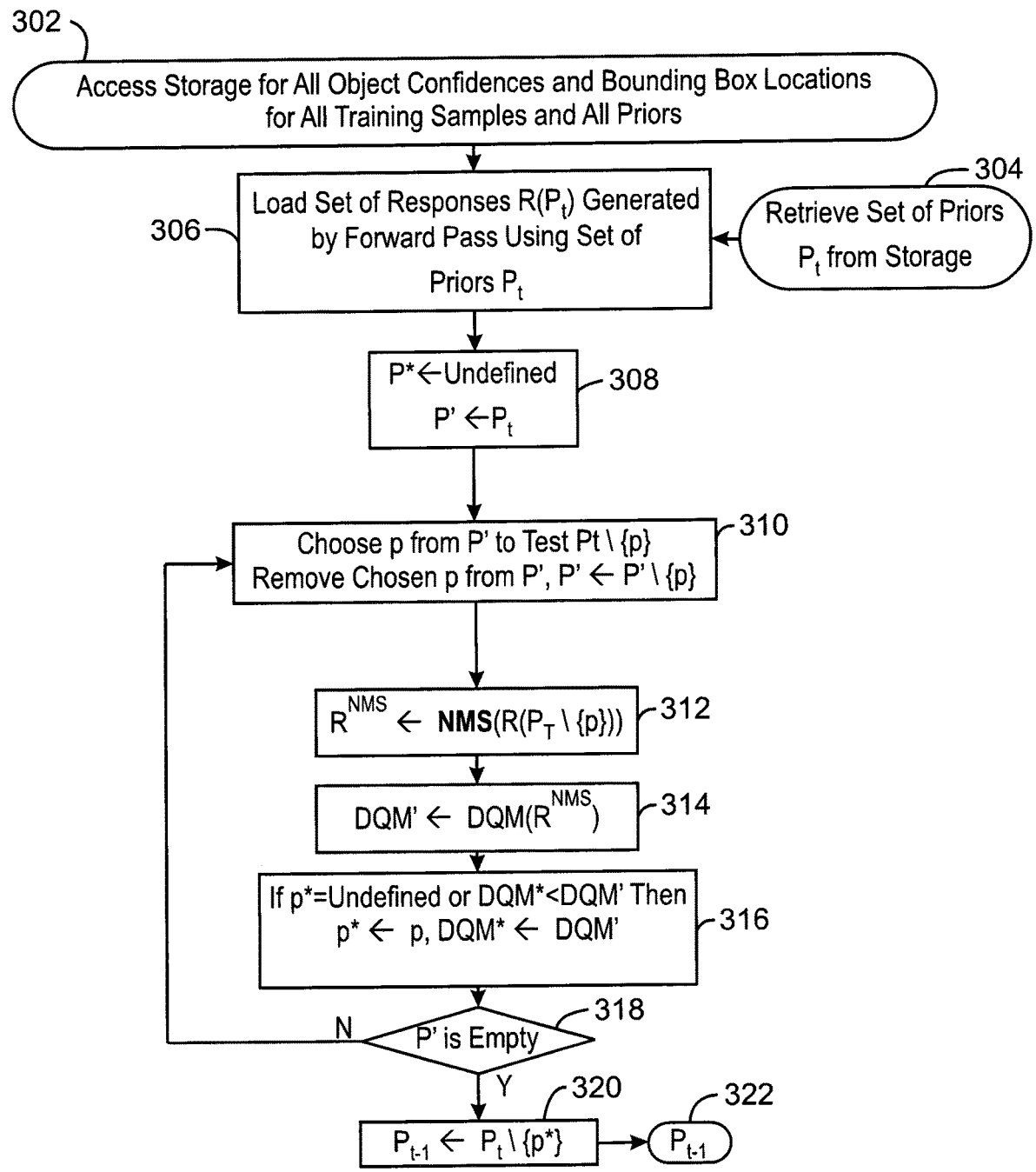
FIG. 3 is a flow chart illustrating an example process for iteration of priors pruning procedure from a set of priors.

FIG. 3 is a flow chart illustrating an example process for iteratively pruning priors from a set of priors. The example process is generally referred to by the reference number 300 and can be implemented in the computing device 500 below.

At block 302, a processor accesses storage for all object confidences and bounding box locations for all training samples and all priors. For example, the object confidences may be class scores computed for each of the priors for all training samples. The bounding box locations may be location predictions generated as described in FIG. 2 above.

At block 304, the processor retrieves a set of priors $P_t$ from the storage. For example, the set of priors may be a set of redundant priors as described in FIG. 2 above.

At block 306, the processor loads a set of responses $R(P_t)$ generated by a forward pass at a trained CNN. For example, the trained CNN may have been trained using set of priors $P_t$. In some examples, the responses $R(P_t)$ may include bounding box shapes, sizes, and location predictions for each of the priors in the set of priors $P_t$. In some examples, one or more of the prior responses may have been disabled by one or more previous iterations of block 320, as described below.

At block 308, the processor assigns a value of "undefined" to a subset P*. In some examples, the processor also assigns the set of priors $P_t$ to a new subset P'.

At block 310, the processor chooses a prior p from the subset P' to test the performance of $P_t$\{p} by removing the chose prior p from P' and thus assigning P'\{p} as the value of P'. P' may thus be said to have a configuration of. For example, the removed prior p may be a prior that is less useful than other priors. In some examples, the usefulness of priors can be calculated using one or more detection quality metrics.

At block, 312 the processor runs a non-maximum suppression (NMS) on a set of responses corresponding to the set of priors $P_t$ without prior p $P_t$\{p}. For example, the set of responses R(PT\{p}) may be filtered to generate the subset of responses $R^{NMS}$. As used herein, $R^{NMS}$(P)=NMS (R(P)) is non-maximum suppression procedure that takes whole R(P) results and returns subset $R^{NMS}$(P) ⊂ R(P) to keep only responses with a locally highest class score. For example, the NMS procedure can start with an empty subset $R^{NMS}$. Then, a response with the highest confidence from R can be placed into $R^{NMS}$ and removed from R. Next, all responses that predict a bounding box that intersects with a bounding box of the best response are removed from R. This process may be repeated until there are no responses left in R. In some examples, other kinds of non-maximum suppression may be performed based on the type of task.

At block 314, the processor calculates any suitable detection quality metric (DQM) on the subset of responses $R^{NMS}$ and assigns the value of the resulting DQM to the metric DQM'.

At block 316, the processor assigns p to p* and DQM' to DQM* if p* is undefined or DQM*<DQM'. For example, the value of DQM* initially can be assigned any DQP* value from tested prior configurations. In some examples, the final value of the DQM* may be a maximum over all the tested prior configurations.

At block 318, the processor determines whether the subset of priors P' is empty. If the subset of priors P' is not empty then the method may proceed back to block 310. If the subset of priors P' is empty, then the method may proceed to block 320.

At block 320, the processor assigns the value of $P_t\backslash\{p^*\}$ to configuration $P_{t-1}$ 322. The processor may then output configuration $P_{t-1}$ 322 to be used for training a detector CNN, such as an SSD object detector or SSD-like object detector CNN. In some examples, the processor can disable one or more prior responses for additional iterations.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
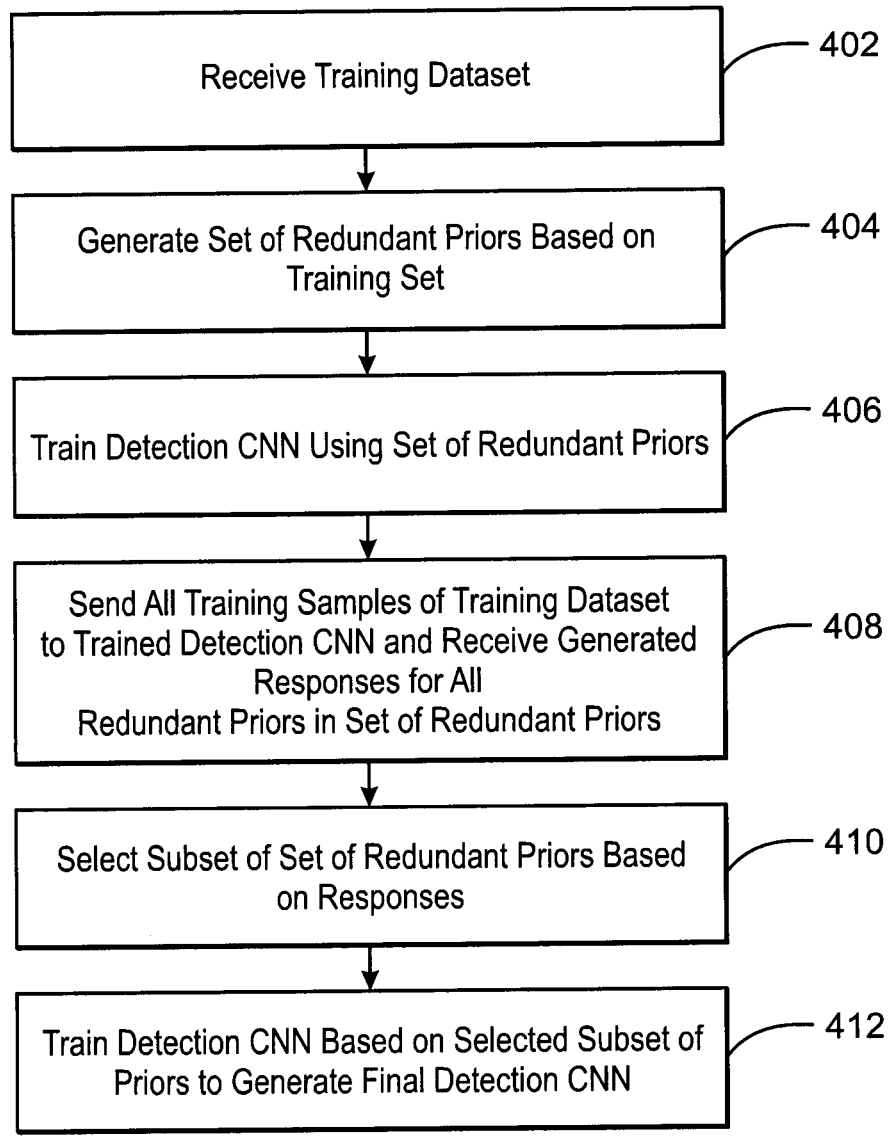
FIG. 4 is a flow chart illustrating a method for selecting priors using iterative pruning.

FIG. 4 is a flow chart illustrating a method for selecting priors using iterative pruning. The example method is generally referred to by the reference number 400 and can be implemented using the system 200 of FIG. 2 above, the processor 502 of the computing device 500 of FIG. 5 below, or the processor 602 and computer readable media 600 of FIG. 6 below.

At block 402, a processor receives a training dataset. For example, the training dataset may include a set of images with one or more annotated objects in one or more classes.

At block 404, the processor generates a set of redundant priors based on the training dataset. For example, the processor can define a redundant number of shapes of priors based on the training dataset and assign each shape of the redundant number of shapes to one or more feature maps to generate the set of redundant priors.

At block 406, the processor trains the detection CNN using the set of redundant priors. The resulting detection CNN may be a trained detection CNN.

At block 408, the processor sends all training samples of the training dataset to the trained detection CNN and receive generated responses for all of the redundant priors in the set of redundant priors from the trained detection CNN. For example, the generated responses may include a class score, bounding box location, and size prediction for each of the redundant priors.

At block 410, the processor selects a subset of the set of redundant priors based on the responses. For example, the processor may select the subset of redundant priors and their configurations using any combination of iterative growing and pruning. In some examples, selecting the subset may include calculating a detection quality metric based on the subset by running non-maximum suppression on responses from the subset of priors to generate final detection results and calculating the detection quality metric based on the final detection results. For example, the detection quality metric may be an average precision metric, a mean average precision metric, a miss rate, or any other suitable detection quality metric. In some examples, the processor can iteratively prune redundant priors from the subset of priors based on a detection quality metric. In some examples, the processor can iteratively add additional priors to the subset of priors based on a detection quality metric. In some examples, the processor can iteratively prune and add priors from and to the subset of priors for a predefined number of times. For example, the processor can iteratively prune and add priors to the subset of priors using the example prune-grow functions described in FIG. 1 above. In some examples, the processor can iteratively prune or add priors to the subset of priors based on a detection quality metric to floating point operation ratio. For example, the processor can iteratively prune or add priors to the subset of priors using the second pruning function prune2($P_t$), the second growing function grow2($P_t$), or the grow-pruning functions prune-grow2a and grow-prune2b described in FIG. 1 above. In some examples, the processor can start to grow priors from an initially empty set. For example, the processor can iteratively grow and prune priors beginning with an empty set as in functions grow-prune1b and grow-prune2b discussed in FIG. 1 above.

At block 412, the processor trains the detection CNN based on the selected subset of priors to generate a final detection CNN. For example, the final detection CNN may be used to detect one or more objects in images received from an imaging device such as a camera.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
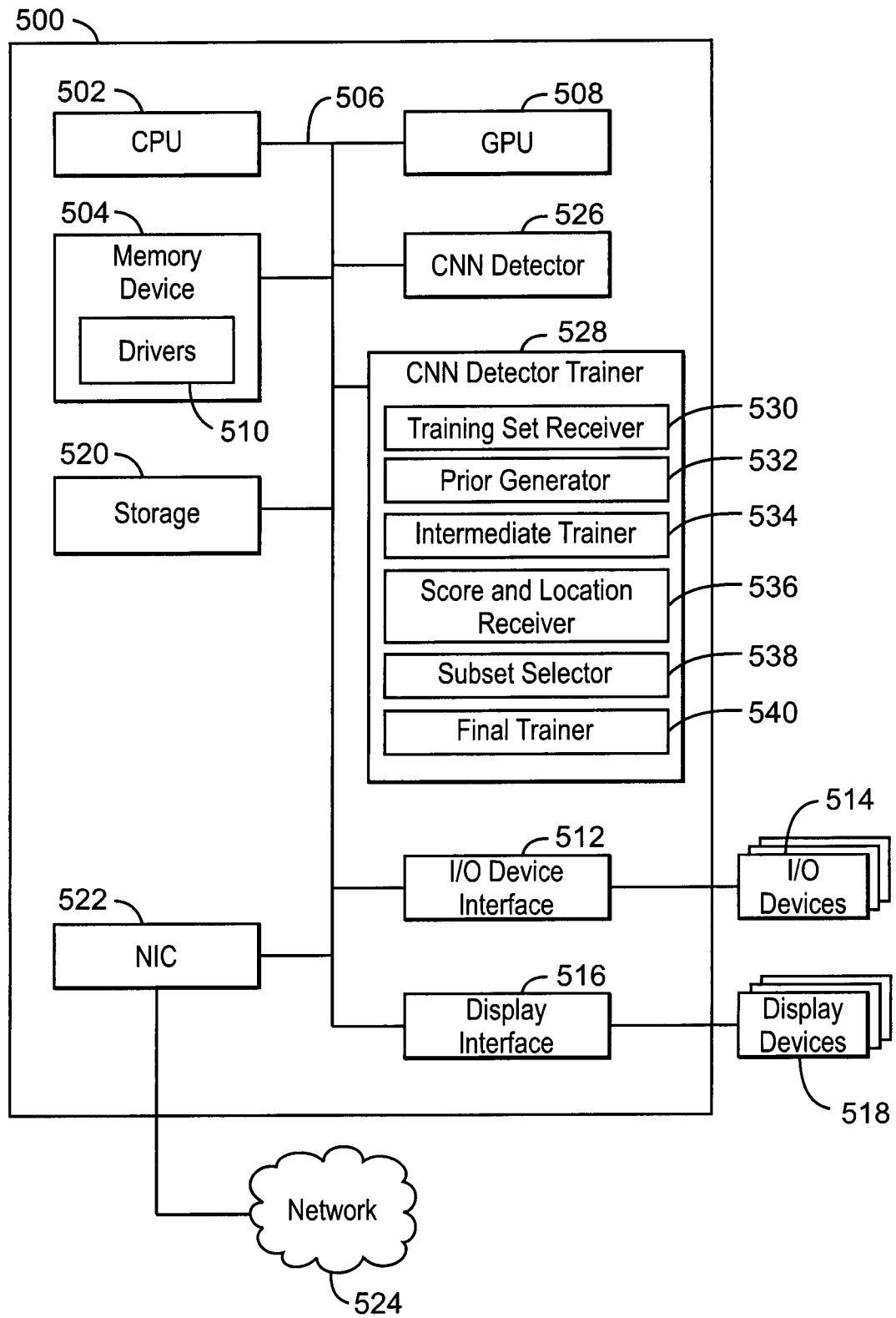
FIG. 5 is block diagram illustrating an example computing device that can select priors using iterative pruning.

Referring now to FIG. 5, a block diagram is shown illustrating an example computing device that can select priors using iterative pruning. The computing device 500 may be, for example, a laptop computer, desktop computer, tablet computer, mobile device, or wearable device, among others. In some examples, the computing device 500 may be a smart device or a surveillance camera. In some examples, the computing device 500 may be an Internet of Things (IoT) device. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating a selected set of priors using iterative pruning. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a convolutional neural network (CNN) detector 526. For example, the CNN detector 526 may be a single-shot multibox detector (SSD), or any SSD-like object detector.

The computing device 500 further includes a CNN detector trainer 528. For example, the CNN detector trainer 528 can be used to train a CNN detector using a selected set of priors. The CNN detector trainer 528 can include a training set receiver 530, a prior generator 532, an intermediate trainer 534, a score and location receiver 536, a subset selector 538, and a final trainer 540. In some examples, each of the components 530-540 of the CNN detector trainer 528 may be a microcontroller, embedded processor, software module, or any combination thereof. The training set receiver 530 can receive a training dataset. For example, the training dataset may include training samples including images with labeled objects. The prior generator 532 can generate a set of redundant priors based on the training dataset. In some examples, prior generator 532 can define a redundant number of shapes of priors based on the training dataset and assign each shape of the redundant number of shapes to one or more feature maps to generate the set of redundant priors. The intermediate trainer 534 can train a detection convolutional neural network (CNN) using the set of redundant priors. The score and location receiver 536 can send all training samples of the training dataset to the trained detection CNN and receive responses for all of the redundant priors in the set of redundant priors. For example, the responses may include class scores, bounding box locations, and size predictions for the redundant priors. The subset selector 538 can select a subset of priors from the set of redundant priors based on the responses. In some examples, the subset selector 538 can calculate a detection quality metric based on the subset by running non-maximum suppression on responses from the subset of priors to generate final detection results and calculating the detection quality metric based on the final detection results. For example, the detection quality metric may be an average precision metric, a mean average precision metric, a miss rate, or any other suitable detection quality metric. In some examples, the subset selector 538 can iteratively prune redundant priors from the subset of priors based on a detection quality metric. In some examples, the subset selector 538 can iteratively add additional priors to the subset of priors based on a detection quality metric. In some examples, the subset selector 538 can iteratively prune and add priors from and to the subset of priors for a predefined number of times to select the subset of priors. The final trainer 540 can train the detection CNN based on the selected subset of priors to generate a final detection CNN.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the training set receiver 530, the prior generator 532, the intermediate trainer 534, the score and location receiver 536, the subset selector 538, and the final trainer 540, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the CNN detector trainer 528 may be implemented with an application specific integrated circuit, in logic implemented in a processor, in logic implemented in a specialized graphics processing unit such as the GPU 508, or in any other device.

Figure 6:
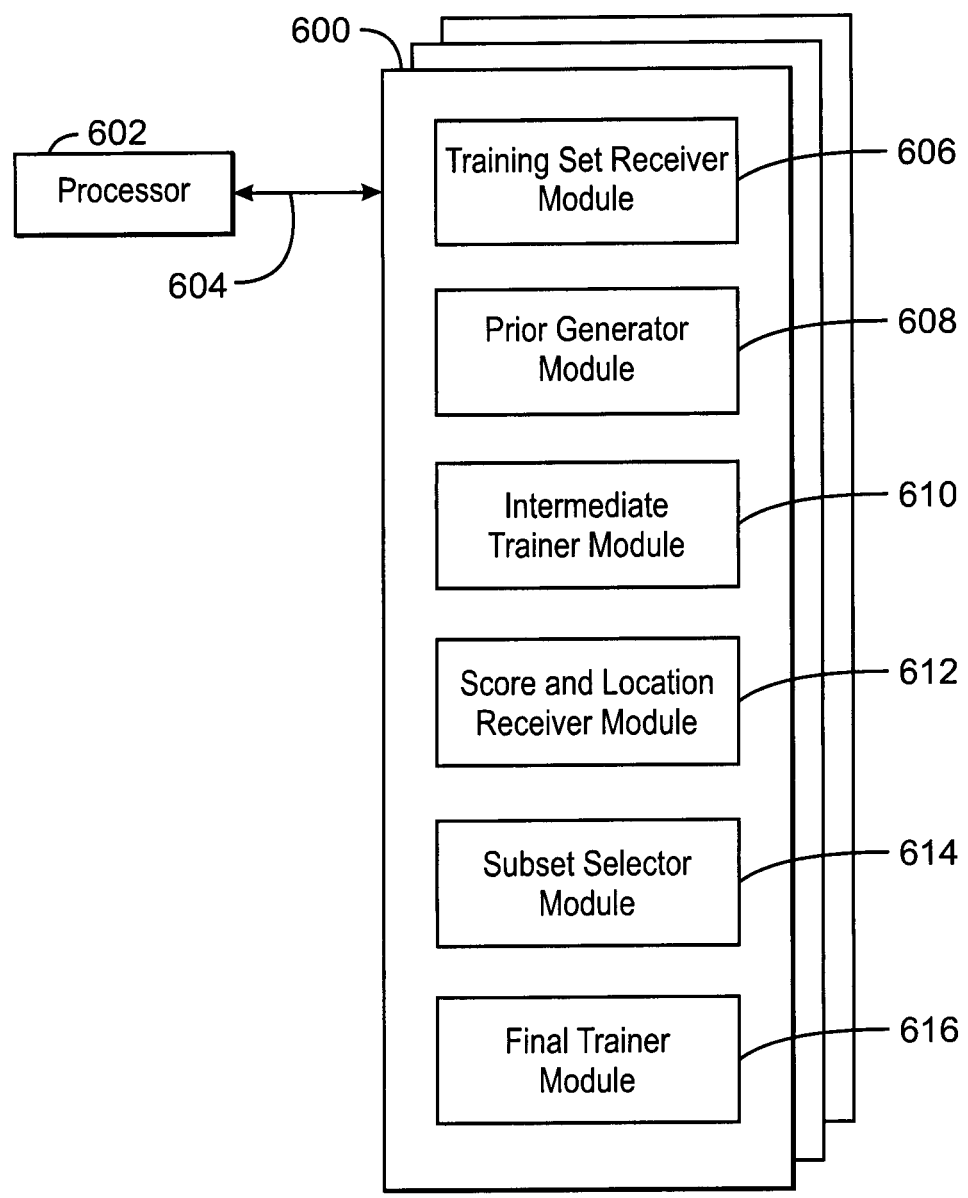
FIG. 6 is a block diagram showing computer readable media that store code for selecting priors using iterative pruning.

FIG. 6 is a block diagram showing computer readable media 600 that store code for selecting priors using iterative pruning. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a training set receiver module 606 may be configured to receive a training dataset. A prior generator module 608 may be configured to generate a set of redundant priors based on the training dataset. In some examples, the prior generator module 608 may be configured to define a redundant number of shapes of priors based on the training dataset. The prior generator module 608 may be configured to then assign each shape of the redundant number of shapes to one or more feature maps to generate the set of redundant priors. An intermediate trainer module 610 may be configured to train the detection CNN using the set of redundant priors. A score and location receiver module 612 may be configured to send all training samples of the training dataset to the trained detection CNN and receive generated responses for all of the redundant priors in the set of redundant priors from the trained detection CNN. For example, the responses can include class scores, bounding box locations, and size predictions for the redundant priors. A subset selector module 614 may be configured to select a subset of the set of redundant priors based on the responses. For example, the subset selector module 614 may be configured to calculate a detection quality metric based on the subset by running non-maximum suppression on responses from the subset of priors to generate final detection results and calculating the detection quality metric based on the final detection results. For example, the detection quality metric may be a mean average precision metric, a mean average precision, a miss rate, or any combination thereof. In some examples, subset selector module 614 may be configured to iteratively prune redundant priors from the subset of priors based on a detection quality metric. In some examples, subset selector module 614 may be configured to iteratively add additional priors to the subset of priors based on a detection quality metric. In some examples, subset selector module 614 may be configured to iteratively prune and add priors from and to the subset of priors for a predefined number of times. In some examples, subset selector module 614 may be configured to iteratively prune or add priors to the subset of priors based on a detection quality metric to floating point operation ratio. A final trainer module 616 may be configured to train the detection CNN based on the selected subset of priors to generate a final detection CNN. In some examples, final detection CNN may then be used to detect objects in received images.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for selecting priors. The apparatus includes a training set receiver to receive a training dataset. The apparatus also includes a prior generator to generate a set of redundant priors based on the training dataset. The apparatus further includes an intermediate trainer to train a detection convolutional neural network (CNN) using the set of redundant priors. The apparatus also further includes a score and location receiver to send all training samples of the training dataset to the trained detection CNN and receive responses for all of the redundant priors in the set of redundant priors. The apparatus also includes and a subset selector to select a subset of priors from the set of redundant priors based on the responses.

Example 2 includes the apparatus of example 1, including or excluding optional features. In this example, the apparatus includes a final trainer to train the detection CNN based on the selected subset of priors to generate a final detection CNN.

Example 3 includes the apparatus of any one of examples 1 to 2, including or excluding optional features. In this example, the subset selector is to calculate a detection quality metric based on the subset by running non-maximum suppression on responses from the subset of priors to generate final detection results and calculating the detection quality metric based on the final detection results.

Example 4 includes the apparatus of any one of examples 1 to 3, including or excluding optional features. In this example, the detection quality metric includes an average precision metric, a mean average precision, a miss rate, or any combination thereof.

Example 5 includes the apparatus of any one of examples 1 to 4, including or excluding optional features. In this example, the prior generator is to define a redundant number of shapes of priors based on the training dataset and assign each shape of the redundant number of shapes to one or more feature maps to generate the set of redundant priors.

Example 6 includes the apparatus of any one of examples 1 to 5, including or excluding optional features. In this example, the responses include class scores, bounding box locations, and size predictions.

Example 7 includes the apparatus of any one of examples 1 to 6, including or excluding optional features. In this example, the subset selector is to iteratively prune redundant priors from the subset of priors based on a detection quality metric.

Example 8 includes the apparatus of any one of examples 1 to 7, including or excluding optional features. In this example, the subset selector is to iteratively add additional priors to the subset of priors based on a detection quality metric.

Example 9 includes the apparatus of any one of examples 1 to 8, including or excluding optional features. In this example, the subset selector is to iteratively prune and add priors from and to the subset of priors for a predefined number of times to select the subset of priors.

Example 10 includes the apparatus of any one of examples 1 to 9, including or excluding optional features. In this example, the detection CNN includes a single-shot multibox detector (SSD)-like object detector.

Example 11 is a method for selecting priors. The method includes receiving, via a processor, a training dataset. The method also includes generating, via the processor, a set of redundant priors based on the training dataset. The method further includes training, via the processor, the detection CNN using the set of redundant priors. The method also further includes sending, via the processor, all training samples of the training dataset to the trained detection CNN and receive generated responses for all of the redundant priors in the set of redundant priors. The method also includes selecting, via the processor, a subset of priors from the set of redundant priors based on the responses.

Example 12 includes the method of example 11, including or excluding optional features. In this example, the method includes training, via the processor, the detection CNN based on the selected subset of priors to generate a final detection CNN.

Example 13 includes the method of any one of examples 11 to 12, including or excluding optional features. In this example, selecting the subset of priors includes calculating a detection quality metric based on the subset by running non-maximum suppression on responses from the subset of priors to generate final detection results and calculating the detection quality metric based on the final detection results.

Example 14 includes the method of any one of examples 11 to 13, including or excluding optional features. In this example, the detection quality metric includes an average precision metric a mean average precision, a miss rate, or any combination thereof.

Example 15 includes the method of any one of examples 11 to 14, including or excluding optional features. In this example, generating the set of redundant priors based on the training dataset includes defining a redundant number of shapes of priors based on the training dataset and assigning each shape of the redundant number of shapes to one or more feature maps to generate the set of redundant priors.

Example 16 includes the method of any one of examples 11 to 15, including or excluding optional features. In this example, the responses include a class score, bounding box location, and size prediction for each of the redundant priors.

Example 17 includes the method of any one of examples 11 to 16, including or excluding optional features. In this example, selecting the subset of priors includes iteratively pruning redundant priors from the subset of priors based on a detection quality metric.

Example 18 includes the method of any one of examples 11 to 17, including or excluding optional features. In this example, selecting the subset of priors includes iteratively adding additional priors to the subset of priors based on a detection quality metric.

Example 19 includes the method of any one of examples 11 to 18, including or excluding optional features. In this example, selecting the subset of priors includes iteratively pruning and adding priors from and to the subset of priors for a predefined number of times.

Example 20 includes the method of any one of examples 11 to 19, including or excluding optional features. In this example, selecting the subset of priors includes iteratively pruning or adding priors to the subset of priors based on a detection quality metric to floating point operation ratio.

Example 21 is at least one computer readable medium for selecting priors having instructions stored therein that. The computer-readable medium includes instructions that direct the processor to receive a training dataset. The computer-readable medium also includes instructions that direct the processor to generate a set of redundant priors based on the training dataset. The computer-readable medium further includes instructions that direct the processor to train the detection CNN using the set of redundant priors. The computer-readable medium also further includes instructions that direct the processor to send all training samples of the training dataset to the trained detection CNN and receive generated class scores, bounding box locations, and size predictions for all of the redundant priors in the set of redundant priors from the trained detection CNN. The computer-readable medium also includes instructions that direct the processor to select a subset of the set of redundant priors based on the class scores, the bounding box locations, and the size predictions. The computer-readable medium also further includes instructions that direct the processor to train the detection CNN based on the selected subset of priors to generate a final detection CNN.

Example 22 includes the computer-readable medium of example 21, including or excluding optional features. In this example, the computer-readable medium includes instructions to calculate a detection quality metric based on the subset by running non-maximum suppression on responses from the subset of priors to generate final detection results and calculating the detection quality metric based on the final detection results.

Example 23 includes the computer-readable medium of any one of examples 21 to 22, including or excluding optional features. In this example, the detection quality metric includes a mean average precision metric a mean average precision, a miss rate, or any combination thereof.

Example 24 includes the computer-readable medium of any one of examples 21 to 23, including or excluding optional features. In this example, the computer-readable medium includes instructions to define a redundant number of shapes of priors based on the training dataset.

Example 25 includes the computer-readable medium of any one of examples 21 to 24, including or excluding optional features. In this example, the computer-readable medium includes instructions to assign each shape of the redundant number of shapes to one or more feature maps to generate the set of redundant priors.

Example 26 includes the computer-readable medium of any one of examples 21 to 25, including or excluding optional features. In this example, the responses include a class score, bounding box location, and size prediction for each of the redundant priors.

Example 27 includes the computer-readable medium of any one of examples 21 to 26, including or excluding optional features. In this example, the computer-readable medium includes instructions to iteratively prune redundant priors from the subset of priors based on a detection quality metric.

Example 28 includes the computer-readable medium of any one of examples 21 to 27, including or excluding optional features. In this example, the computer-readable medium includes instructions to iteratively add additional priors to the subset of priors based on a detection quality metric.

Example 29 includes the computer-readable medium of any one of examples 21 to 28, including or excluding optional features. In this example, the computer-readable medium includes instructions to iteratively prune and add priors from and to the subset of priors for a predefined number of times.

Example 30 includes the computer-readable medium of any one of examples 21 to 29, including or excluding optional features. In this example, the computer-readable medium includes instructions to iteratively prune or add priors to the subset of priors based on a detection quality metric to floating point operation ratio.

Example 31 is a system for selecting priors. The system includes a training set receiver to receive a training dataset. The system also includes a prior generator to generate a set of redundant priors based on the training dataset. The system also further includes an intermediate trainer to train a detection convolutional neural network (CNN) using the set of redundant priors. The system also includes a score and location receiver to send all training samples of the training dataset to the trained detection CNN and receive responses for all of the redundant priors in the set of redundant priors.

The system also further includes and a subset selector to select a subset of priors from the set of redundant priors based on the responses.

Example 32 includes the system of example 31, including or excluding optional features. In this example, the system includes a final trainer to train the detection CNN based on the selected subset of priors to generate a final detection CNN.

Example 33 includes the system of any one of examples 31 to 32, including or excluding optional features. In this example, the subset selector is to calculate a detection quality metric based on the subset by running non-maximum suppression on responses from the subset of priors to generate final detection results and calculating the detection quality metric based on the final detection results.

Example 34 includes the system of any one of examples 31 to 33, including or excluding optional features. In this example, the detection quality metric includes an average precision metric, a mean average precision, a miss rate, or any combination thereof.

Example 35 includes the system of any one of examples 31 to 34, including or excluding optional features. In this example, the prior generator is to define a redundant number of shapes of priors based on the training dataset and assign each shape of the redundant number of shapes to one or more feature maps to generate the set of redundant priors.

Example 36 includes the system of any one of examples 31 to 35, including or excluding optional features. In this example, the responses include class scores, bounding box locations, and size predictions.

Example 37 includes the system of any one of examples 31 to 36, including or excluding optional features. In this example, the subset selector is to iteratively prune redundant priors from the subset of priors based on a detection quality metric.

Example 38 includes the system of any one of examples 31 to 37, including or excluding optional features. In this example, the subset selector is to iteratively add additional priors to the subset of priors based on a detection quality metric.

Example 39 includes the system of any one of examples 31 to 38, including or excluding optional features. In this example, the subset selector is to iteratively prune and add priors from and to the subset of priors for a predefined number of times to select the subset of priors.

Example 40 includes the system of any one of examples 31 to 39, including or excluding optional features. In this example, the detection CNN includes a single-shot multibox detector (SSD)-like object detector.

Example 41 is a system for selecting priors. The system includes means for receiving a training dataset. The system also includes means for generating a set of redundant priors based on the training dataset. The system also further includes means for training a detection convolutional neural network (CNN) using the set of redundant priors. The system also includes means for sending all training samples of the training dataset to the trained detection CNN and receive responses for all of the redundant priors in the set of redundant priors. The system also further includes means for selecting a subset of priors from the set of redundant priors based on the responses.

Example 42 includes the system of example 41, including or excluding optional features. In this example, the system includes means for training the detection CNN based on the selected subset of priors to generate a final detection CNN.

Example 43 includes the system of any one of examples 41 to 42, including or excluding optional features. In this example, the means for selecting the subset of priors is to calculate a detection quality metric based on the subset by running non-maximum suppression on responses from the subset of priors to generate final detection results and calculating the detection quality metric based on the final detection results.

Example 44 includes the system of any one of examples 41 to 43, including or excluding optional features. In this example, the detection quality metric includes an average precision metric, a mean average precision, a miss rate, or any combination thereof.

Example 45 includes the system of any one of examples 41 to 44, including or excluding optional features. In this example, the means for generating the set of redundant priors is to define a redundant number of shapes of priors based on the training dataset and assign each shape of the redundant number of shapes to one or more feature maps to generate the set of redundant priors.

Example 46 includes the system of any one of examples 41 to 45, including or excluding optional features. In this example, the responses include class scores, bounding box locations, and size predictions.

Example 47 includes the system of any one of examples 41 to 46, including or excluding optional features. In this example, the means for selecting the subset of priors is to iteratively prune redundant priors from the subset of priors based on a detection quality metric.

Example 48 includes the system of any one of examples 41 to 47, including or excluding optional features. In this example, the means for selecting the subset of priors is to iteratively add additional priors to the subset of priors based on a detection quality metric.

Example 49 includes the system of any one of examples 41 to 48, including or excluding optional features. In this example, the means for selecting the subset of priors is to iteratively prune and add priors from and to the subset of priors for a predefined number of times to select the subset of priors.

Example 50 includes the system of any one of examples 41 to 49, including or excluding optional features. In this example, the detection CNN includes a single-shot multibox detector (SSD)-like object detector.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for selecting priors, comprising:
a training set receiver to receive a training dataset;
a prior generator to generate a set of redundant priors based on the training dataset;
an intermediate trainer to train a detection convolutional neural network (CNN) using the set of redundant priors;
a score and location receiver to send all training samples of the training dataset to the trained detection CNN and receive responses for all of the redundant priors in the set of redundant priors; and
a subset selector to select a subset of priors from the set of redundant priors based on the responses and iteratively add additional priors to the subset of priors based on a detection quality metric.

2. The apparatus of claim 1, further including a final trainer to train the detection CNN based on the selected subset of priors to generate a final detection CNN.

3. The apparatus of claim 1, wherein the subset selector is to calculate the detection quality metric based on the subset of priors by running non-maximum suppression on responses from the subset of priors to generate final detection results and calculating the detection quality metric based on the final detection results.

4. The apparatus of claim 3, wherein the detection quality metric includes at least one of an average precision metric, a mean average precision, or a miss rate.

5. The apparatus of claim 1, wherein the prior generator is to define a redundant number of shapes of priors based on the training dataset and assign each shape of the redundant number of shapes to one or more feature maps to generate the set of redundant priors.

6. The apparatus of claim 1, wherein the responses include class scores, bounding box locations, and size predictions.

7. The apparatus of claim 1, wherein the subset selector is to iteratively prune redundant priors from the subset of priors based on the detection quality metric.

8. The apparatus of claim 1, wherein the subset selector is to iteratively add priors to the subset of priors for a predefined number of times to select the subset of priors and iteratively prune priors from the subset of priors for a predefined number of times to select the subset of priors.

9. The apparatus of claim 1, wherein the detection CNN includes a single-shot multibox detector (SSD)-like object detector.

10. A method for selecting priors, comprising:
receiving, via a processor, a training dataset;
generating, via the processor, a set of redundant priors based on the training dataset;
training, via the processor, a detection convolutional neural network (CNN) using the set of redundant priors;
sending, via the processor, all training samples of the training dataset to the trained detection CNN and receive generated responses for all of the redundant priors in the set of redundant priors;
selecting, via the processor, a subset of priors from the set of redundant priors based on the generated responses; and
adding, through an iterative process, additional priors to the subset of priors based on a detection quality metric.

11. The method of claim 10, further including training, via the processor, the detection CNN based on the selected subset of priors to generate a final detection CNN.

12. The method of claim 10, wherein selecting the subset of priors includes calculating the detection quality metric based on the subset of priors by running non-maximum suppression on responses from the subset of priors to generate final detection results and calculating the detection quality metric based on the final detection results.

13. The method of claim 12, wherein the detection quality metric includes at least one of an average precision metric, a mean average precision, or a miss rate.

14. The method of claim 10, wherein generating the set of redundant priors based on the training dataset includes defining a redundant number of shapes of priors based on the training dataset and assigning each shape of the redundant number of shapes to one or more feature maps to generate the set of redundant priors.

15. The method of claim 10, wherein the generated responses include a class score, bounding box location, and size prediction for each of the redundant priors.

16. The method of claim 10, wherein selecting the subset of priors includes iteratively pruning redundant priors from the subset of priors based on the detection quality metric.

17. The method of claim 10, wherein selecting the subset of priors includes iteratively adding priors to the subset of priors for a predefined number of times and iteratively pruning priors from the subset of priors for a predefined number of times.

18. The method of claim 10, wherein selecting the subset of priors includes iteratively pruning or adding priors to the subset of priors based on a detection quality metric to floating point operation ratio.

19. At least one computer readable medium for selecting priors having instructions stored therein that, in response to being executed on a computing device, cause the computing device to: receive a training dataset; generate a set of redundant priors based on the training dataset; train a detection convolutional neural network (CNN) using the set of redundant priors; send all training samples of the training dataset to the trained detection CNN and receive generated class scores, bounding box locations, and size predictions for all of the redundant priors in the set of redundant priors from the trained detection CNN; select a subset of the set of redundant priors based on the generated class scores, the bounding box locations, and the size predictions; add, through an iterative process, additional priors to the subset of priors based on a detection quality metric; and train the detection CNN based on the selected subset of priors to generate a final detection CNN.

20. The at least one computer readable medium of claim 19, further including instructions to calculate the detection quality metric based on the subset by running non-maximum suppression on responses from the selected subset of priors to generate final detection results and calculating the detection quality metric based on the final detection results.

21. The at least one computer readable medium of claim 20, wherein the detection quality metric includes at least one of a mean average precision metric, a mean average precision, or a miss rate.

22. The at least one computer readable medium of claim 20, further including instructions to define a redundant number of shapes of priors based on the training dataset.

23. The at least one computer readable medium of claim 20, further including instructions to assign each shape of the redundant number of shapes to one or more feature maps to generate the set of redundant priors.

* * * * *